Jan. 23, 1962 G. F. KAROW 3,017,786
VARIABLE SPEED PLANETARY GEAR TRANSMISSION
AND VEHICLE DRIVE ARRANGEMENT
Original Filed Dec. 14, 1950 6 Sheets-Sheet 1

FIG. 1A

INVENTOR.
George F. Karow

Jan. 23, 1962  G. F. KAROW  3,017,786
VARIABLE SPEED PLANETARY GEAR TRANSMISSION
AND VEHICLE DRIVE ARRANGEMENT
Original Filed Dec. 14, 1950  6 Sheets-Sheet 3

INVENTOR
George F. Karow

INVENTOR.
George F. Karow

United States Patent Office 3,017,786
Patented Jan. 23, 1962

3,017,786
VARIABLE SPEED PLANETARY GEAR TRANSMISSION AND VEHICLE DRIVE ARRANGEMENT
George F. Karow, P.O. Box 1, Saginaw, Mich.
Original application Dec. 14, 1950, Ser. No. 200,725, now Patent No. 2,877,665, dated Mar. 17, 1959. Divided and this application Dec. 22, 1958, Ser. No. 782,039
38 Claims. (Cl. 74—677)

This is a division of application Serial No. 200,725; filed Dec. 14, 1950; now Patent No. 2,877,665; issued Mar. 17, 1959 under the same title. The applicant claims for the present application the benefit of the filing date of the original application.

This invention relates generally to variable speed power transmitting means and more particularly to the type used in motor vehicles having variable coupling means combined with a variable speed means with either selective or automatic controls. Special interest residing in the arrangement wherein the power enters and leaves such a mechanism at one and the same end thereof.

In accordance with this invention a variable coupling means of either the torque converter or fluid coupling type is connected to a variable speed means of the selective speed type illustrated here as a planetary gear train. Elements of both the coupling means and speed means are hydraulically operated by friction clutches, or one-way clutches.

One of the objects of this invention is to provide variable speed means wherein a driving element of a planetary gear set thereof can be selectively connected to the input shaft thereof.

Another object of this invention is to provide variable speed means wherein each of two driving elements of a planetary gear set thereof can be selectively connected to the input shaft thereof.

It is another object of this invention to provide variable coupling means having a reaction member, combined with a variable speed means wherein one of the aforesaid driving elements of the speed means is also selectively connectable to the reaction member of the coupling means.

It is another object of this invention to provide a mechanism having variable coupling means and variable speed means, wherein the speed means has a tubular input shaft connected at one end to the driven member of the coupling means.

Another object of this invention is to provide a mechanism as set forth in the previous paragraph, wherein the variable speed means has an output shaft coaxial with and extending through and beyond said one end of the tubular shaft.

Another object of this invention is to provide a mechanism as set forth in the two previous paragraphs, wherein the output shaft also extends out and beyond the opposite end of the variable speed means.

It is another object of this invention to provide a variable speed means comprising a case enclosing a set of planetary gears having a planet carrier a portion of which is cupped to form a drum for frictionally contacting a brake band supported by and operably connected to the case.

Still another object of this invention is to provide a mechanism as set forth in the foregoing paragraph wherein a power output shaft is connected to the planet carrier.

Another object of this invention is to provide a mechanism having a tubular power shaft, variable coupling means having the driving member thereof connected to the power shaft, variable speed means having a tubular power input shaft aligned with the power shaft and connected at one end to the driven member of the coupling, a power output shaft coaxial with and extending through the aforesaid tubular shafts and means for variably connecting the opposite end of the input shaft to said output shaft.

It is another object of this invention to provide a mechanism as set forth in the preceding paragraph wherein the output shaft also extends beyond said opposite end of the variable speed means.

The foregoing as well as other objects of this invention will be made more apparent as this description proceeds, especially when considered in connection with the accompanying drawings, wherein.

While these designs are executed with a desire for standardization and interchangeability of parts, it must be understood that if so desired the multiple disc brakes housed in the stationary casings can be replaced with the well known contracting brake band mechanisms. If such be the case, the mechanism shown in FIGURES 5, 6 and 6A of the drawings would be a desirable means of operating these bands.

Figure 1A:
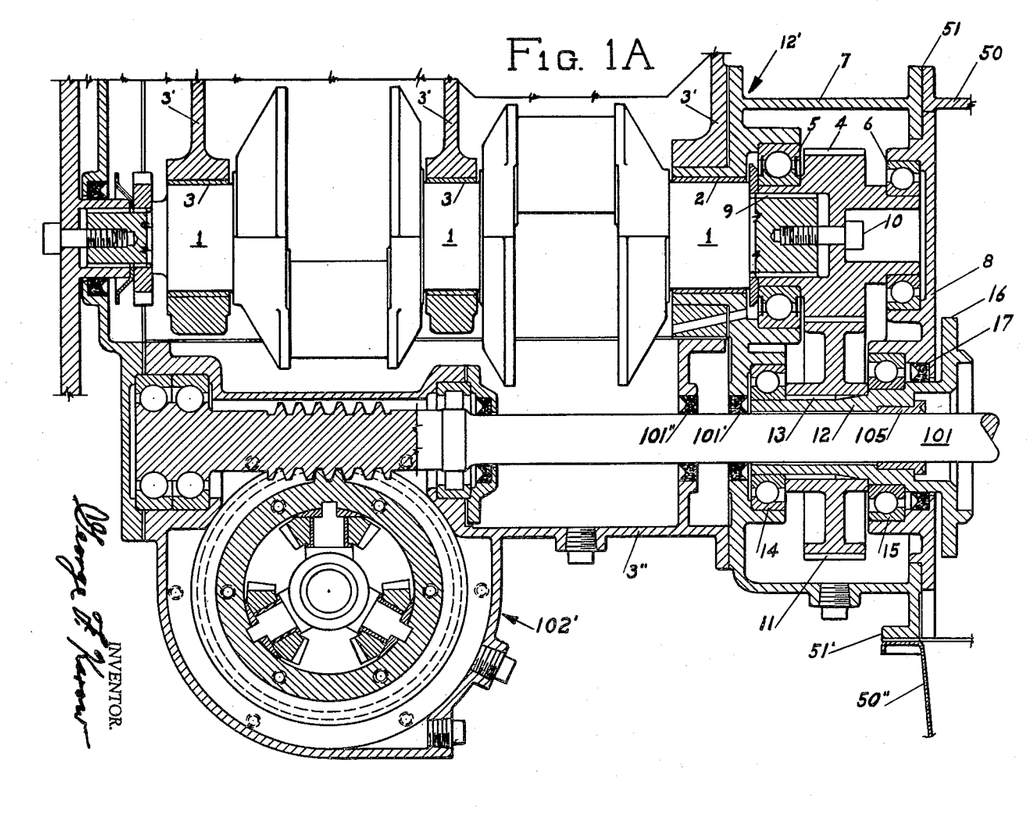
FIGURES 1A and 1B of the drawings are longitudinal sectional views of one embodiment of the invention shown as connected to a "Power Transmitting Mechanism For Motor Vehicles" issued Jan. 1, 1952 as United States Letters Patent No. 2,581,025 under application Serial No. 98,202 filed by this applicant June 10, 1949. The invention is shown as a selective control means for the reaction member of a variable coupling means combined with the selective control of a planetary gear set in a variable speed means.
Figure 1B:
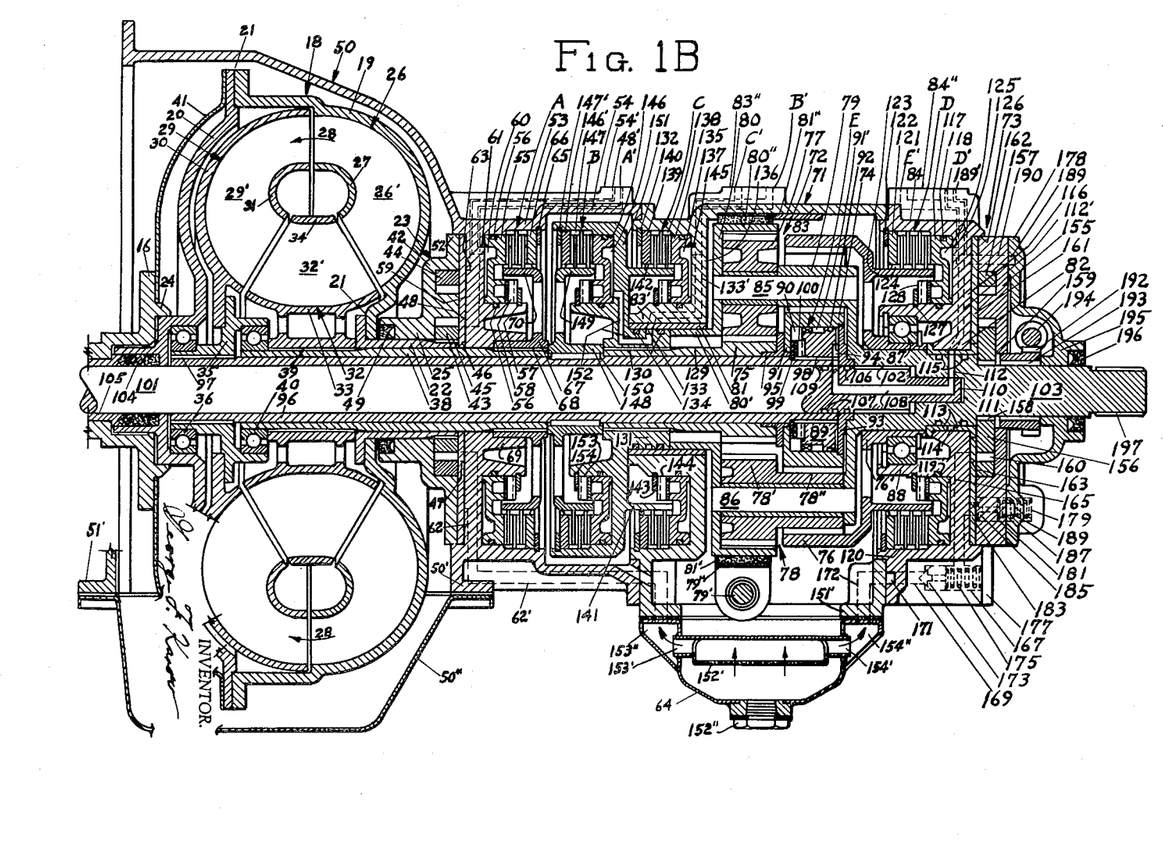

Now referring to FIGURES 1A and 1B of the drawings for a more detailed description of the invention wherein a power transmitting mechanism 12' has an engine shaft 1 rotatively supported in main bearings 2 and 3 of an engine block 3'. A driving gear 4 is rotatively supported by bearings 5 and 6 housed in a gear case 7 and a bearing retainer 8 respectively. The driving gear 4 is supported coaxially with the main bearings 2 and 3 of the engine shaft 1 and is suitably connected to said shaft by a spline 9 and a screw 10.

A driven gear 11 meshes with the driving gear gear 4 and is suitably connected to a tubular power shaft 12 by a spline 13. The tubular power shaft 12 is rotatively supported by bearings 14 and 15 housed in the case 7 and the bearing retainer 8 respectively. The tubular power shaft 12 is formed with a flange 16 at the end adjacent the bearing retainer 8 and has an oil seal 17 where it passes through said retainer. An engine bottom pan 3" is suitably connected to the engine block 3' and helps to support the gear case 7.

Variable coupling means 18, shown here as a three member torque converter, has a housing 19 suitably flanged and connected at 21' to a flanged tubular pump shaft 22 of a pump 23. An end plate 20 forms a suitable closure for the housing 19 and is suitably formed and connected thereto at a flange 21. The coupling 18 is suitably supported at one end by a recess in the end of the shaft 12 formed by a concentric rim 24 thereon, and slidably retains the hub part of the end plate 20. The coupling 18 is suitably supported for rotation at the other end by the shaft 22 and a bearing 25 in the pump 23.

A driving connection is provided between the tubular power shaft 12 and the variable coupling 18 by a flexible driving disc 41 which compensates for the slight inaccuracies of manufacture which would cause misalignment of the rotating parts of the coupling 18 in relation to the power shaft 12. The driving disc 41 is suitably connected to the flange 16 on the shaft 12 and the flange 21 on the coupling 18.

An impeller or driving member 26 of the coupling 18 is formed with suitably pitched blades or vanes 26' supported between the housing 19 and an inner wall 27 to form a pump unit to force circulation of oil in a spirally orbital path about the axis of rotation of the coupling 18 when the housing 19 is rotated. The arrows 28 indicate the direction of flow.

A turbine or driven mmeber 29 of the coupling 18 is formed with a curved outer wall 30 and an inner wall 31 supporting pitched blades or vanes 29' which are so pitched as to cause the oil flow to rotate the driven member 29 in the same direction as the driving member 26. The driven member 29 is suitably connected to a flanged cocentric adapter 35 which rotatively supports it relative to the housing 19. The adapter 35 is supported in a bearing 36 which is housed in the end plate 20.

A stator or reaction member 32 of the coupling 18 has a curved outer wall 33 and an inner wall 34 supporting pitched blades or vanes 32' which are so pitched as to cause the oil flow to rotate the reaction member 32 in a direction opposite to that of the driving and driven members 26 and 29 respectively. The reaction member 32 is suitably connected to one end of a tubular brake shaft 38 by a spline 39 and is rotatively supported relative to the driving and driven members 26 and 29 respectively by a bearing 40 housed in the adapter 35 and supporting the brake shaft 38.

The oil pump 23 is of the conventional type having a housing 42 recessed to receive intermeshing external and internal gears 43 and 44 respectively. The external gear 43 is suitably connected to the tubular shaft 22 by a spline 45, is concentric therewith and rotated thereby. A pump backing plate 46 seals the gears 43 and 44 in the housing 42 and has passages 47 and 48 through the plate for pump inlet and outlet respectively (partially shown). An oil seal 9 is provided between one end of the housing 42 and the shaft 22.

A bell housing 50 is suitably flanged and connected to the gear case 7 as shown at 51 and has a recess 52 which supports the pump housing 42 of the pump 23 concentric with the coupling 18. The gear case 7 is formed with a lower flange 51' and the housing 50 has a cooperating flanged opening 50' to which a bottom pan 50" is suitably fastened. The bell housing 50 has tubular extensions 53 and 54 which house a multiple disc brake "A" and also enclose a clutch "B" respectively.

The extension 53 has an annular recess concentric about the shaft 38 for slidably supporting an annular piston 55 which has an external sealing ring 56. The recess is formed with a cylindrical portion at the inner diameter which is grooved to support a sealing ring 56 and a locking ring 57. The locking ring 57 forcibly supports a corrugated washer spring 58 against the piston 55 and moves said piston into the exhausted position in the recess for disengagement of the brake "A." A wall 59 at the juncture of the bell housing 50 and the extension 53, with the piston 55 forms a pressure chamber 60 in which fluid under pressure is admitted to engage the brake "A." Passages 61 and 63 in the wall 59 connect the pressure chamber 60 and the pump outlet 48 respectively to the surface 54' to which in turn a speed selector valve (not shown) is suitably attached. Passages 62 and 62' in the wall 59 and extensions 53 and 54 respectively connect the pump inlet 47 to an oil pan and reservoir 64.

Longitudinal internal serrations are provided in the extension 53 adjacent the outer diameter of the piston 55 for engaging mating lugs on the nonrotative discs of the brake "A." A groove is provided at the outer end of the serrations for a locking ring 65 which supports a backing ring 66. The brake "A" has a hub 67 suitably connected to the other end of the tubular brake shaft 38 as shown by a spline 68 and is rotatively supported by a concentric hub portion 69 of the wall 59. The brake hub 67 has a cupped outer rim 70 having longitudinal external serrations engaging mating internal lugs on the rotative discs of the brake "A." Wearing discs are provided between each rotative disc and nonrotative disc or part, (i.e., the piston 55 and ring 66).

In operation the brake "A" controls the rotation of the reaction member 32 of the coupling 18. When fluid under pressure is admitted to the chamber 60, the piston 55 presses the brake discs together and frictionally engages them. This locks the reaction member 32 to the case or extension 53. Conversely when the pressure in the chamber 60 is released, the spring 58 forces the piston 55 away from the discs releasing the rotative discs and consequently permitting the reaction member 32 to rotate in either direction thus preventing torque multiplication in the coupling 18.

A variable speed means 71 consists of a set of planetary gears 72 and control means comprising a multiple disc clutch "B," multiple disc brakes "C" and "D" and a dog clutch "E" for controlling the action of the separate elements of the gear set. A second oil pump 73 is also provided to augment the capacity of the first pump 23.

The planetary gear set 72 consists of a large sun gear 74 (the driving element for forward speeds), a small sun gear 75 (the driving element for reverse speeds), a ring gear 76 (the element locked to the case for low and reverse speeds) encircling the larger of the sun gears, a planetary idler gear 77 meshing with the smaller sun gear 75 and a gear 78' of a planetary cluster gear 78, a gear 78" which also meshes with the ring gear 76 and large sun gear 74, a planet carrier 79 (the power output element of the gear set) and a carrier part 80 suitably connected to it and having a tubular portion 80' and cupped drum portion 80" are supported for rotation on bearings 81 and 82 in a hub part 83' of a case 83 and a case end part 84 respectively.

An operating shaft 79' suitably supported for rotation in the case 83, supports a band 79" and lining 81' and is suitably operable to cause the band 79" to frictionally contact the outer surface of the drum portion 80". A bar 81" slidably supports the band 79" in a position adjacent the drum 80".

The carrier 79 and part 80 are suitably fitted with a pin 85 which supports the idler gear 77 for rotation. A pin 86 suitably fitted to the carrier 79 and part 80 supports the planet cluster gear 78 for rotation. The ring gear 76 is suitably supported for rotation by an extension 76′ and a bearing 87 which is housed in a hub part 88 of the case end part 84.

The large sun gear 74 is selectively connectable to a gear hub and clutch piston 89 thru the dog clutch "E." The clutch "E" consists of an annular ring of internal gear teeth or lugs on the inner circumference of the gear rim spaced a distance 90 from a flange 91 of the gear 74. The gear hub and clutch piston 89 has a similar annular ring of external gear teeth or mating lugs on one end of a portion reduced in diameter and spaced a distance 91′ from the maximum diameter of the piston which is grooved for supporting a ring 92 sealing the piston 89 to the inside diameter of the rim of the gear 74. An end wall 93 suitably connected to the rim of the gear 74 on the side opposite the flange 91, with the piston 89 forms a pressure chamber 94. The wall 93 with the flange 91 and a flanged bushing 95 connected to it, suitably support the gear 74 for rotation without radial pressure on the piston 89.

A tubular power input shaft 96 of the variable speed means 71 is supported for rotation coaxially with the shafts 12, 22, and 38 and is suitably connected at one end to the driven member 29 of the variable coupling 18 by the flanged adaptor 35 and spline 97. The power input shaft 96 is slidably connected at the other end to the clutch piston 89 by a spline 98. A thrust washer 99 contacts the flange 91 and acts as a synchronizer between the piston 89 and the gear 74 and has serrations on its inner diameter to engage the spline 98 on the shaft 96 to make it rotate therewith. A corrugated washer spring 100 is interposed between the piston 89 and the washer 99.

In operation the spring 100 forces the piston 89 away from the washer 99 and the flange 91 to engage the mating external and internal lugs of the clutch "E." When fluid under pressure is admitted to the chamber 94, the piston 89 is forced against the spring 100, washer 99 and flange 91. The external lugs of the clutch "E" then slide into the space 90 and leaves the internal lugs free to rotate in the space 91′. Then relative rotation is permitted between the gear 74 and the piston 89. Therefore the gear 74 is then free to rotate independently of the power input shaft 96.

A power output shaft 101 of the variable speed means 71 is suitably connected to and supported by the planet carrier 79 by the spline 102 and is rotatively mounted coaxially with and passes through the coaxial tubular shafts 12, 96, 38 and 22 and may be operatively connected through a differential drive 102′ to one set of wheels of a motor vehicle. Each of these shafts is free to rotate independently of the others. The shaft 101 rotatively supports the wall 93 and the gear end of the tubular shaft 96. Sealing rings 106 and 107 form a liquid seal between the shaft 101 and the wall 93 and the shaft 96 respectively on either side of a passage 108 and groove 109 in the shaft 101. The shaft 101 has an extension 110 that fits snugly into a recess 111 in a shaft 103 to permit a connection between a passage 112 in the shaft 103 and the passage 108 in the extension 110.

The cylindrical extension 103 of the planet carrier 79 is connected to and supported for rotation coaxially with the shaft 101 and provides a second power output shaft extending through and beyond the end of the variable speed means 71 opposite the variable coupling means 18 and can be operatively connected to a second set of wheels of the motor vehicle. Chevron packing 104 seals the fluid chamber of the variable coupling means 18 where the shaft 101 leaves the chamber to be supported for rotation in a bearing 105.

It is understood that when the coupling 18 is directly connected to an engine shaft in place of the tubular shaft 12, the tubular shaft 96 would become a solid shaft and somewhat smaller in diameter as well as the diameters of all the adjacent parts. The extension or shaft 103 would then be the one and only power output shaft, and would rotatively support the solid shaft 96 at a point where the spline 102 is now shown.

The bearing 82 is lined with flanged bushings 113 spaced apart at their inner ends to form a groove 114 which is aligned with and connects to the passage 112. Sealing rings 115 in the shaft extension 103 on either side of the groove 114 form a liquid seal between the shaft 103 and the bushings 113. A passage 112′ in a wall 116 connects the groove 114 to a surface 84″ which is provided for attachment of the speed selector valve (not shown).

The end wall 116 in the case end part 84 supports the bearing 82 and hub part 88 and cooperates with the latter to form a recess which slidably supports the annular piston 117. A sealing ring 118 in the outer diameter of the piston 117 forms a fluid seal between the piston and the adjacent end part 84. A sealing ring 119 supported in a groove in the hub part 88 adjacent the piston forms a fluid seal between the two. Longitudinal internal serrations 120 are provided in the part 84 adjacent the outer diameter of the recess for the piston 117 for engaging mating external lugs on the outer diameter of the nonrotating discs of the brake "D" and a backing ring 121. A locking ring 122 is supported by a groove in the part 84 adjacent the ring 121.

The ring gear 76 has a tubular extension 123 on the outer diameter of which longitudinal external serrations 124 are provided to engage mating internal lugs on the inner diameter of the rotating discs of the brake "D." The rotating discs of the brake "D" are suitably separated from the nonrotating discs and parts 84 and 121 by wearing discs without lugs.

A pressure chamber 125 is formed by the wall 116 and the piston 117. A passage 126 in the end part 84 and the wall 116 connects the chamber 125 to the surface 84″ which is provided for the attachment of the speed selector valve (not shown). A locking ring 127 is secured in a groove in the hub part 88 near the inner diameter of the piston 117 and supports a corrugated washer spring 128 to force the piston 117 to its exhausted position in the recess provided therefore.

In operation when fluid under pressure is admitted to the chamber 125, the piston 117 moves toward the locking ring 122 and compresses the spring 128 while frictionally engaging the discs of the brake "D." The ring gear 76 is then locked to the case end part 84 and rotation thereof is prevented. When the pressure in the chamber 125 is relieved, the spring 128 supported by the locking ring 127 forces the piston 117 in the opposite direction disengaging the discs of the brake "D" and the ring gear 76 is then free to rotate.

The small sun gear 75 is rotatively supported at one end by the bushing 95 and has a tubular extension 129 at the other end connected by a spline 130 to and rotatively supported by a hub 131 of a rotative clutch housing 132. The hub 131 is rotatively supported in the bearing 81 and has an annular groove 133 on its outer diameter, sealed by rings 134 on either side.

The multiple disc brake "C" is identical in construction and operation as the brake "D" but has a recess in the case 83 for slidably supporting the annular piston 135. A wall 136 of the case 83 supports the hub part 83′ and with the piston 135 forms a pressure chamber 137. Longitudinal internal serrations 138 in the case 83 engage mating external lugs on the nonrotative discs of the brake "C" and the backing ring 139. A locking ring 140 is supported in a groove in the case 83 adjacent the ring 139. A tubular extension 141 of the clutch housing 132 has longitudinal external serrations 142 engaging mating internal lugs on the rotative discs of the brake "C." Wearing discs without lugs are provided between the rotative and nonrotative discs and parts 135 and 139. A locking ring 143 is supported by a groove in the hub 83′ adjacent a corrugated washer spring 144 which also engages the disc side of the piston 135. A passage 145 in the wall 136 connects the pressure chamber 137 to a surface 83" which is provided for the attachment of a speed selector valve (not shown).

In operation when fluid under pressure is admitted to the pressure chamber 137, the piston 135 forces the discs to frictionally engage each other and thereby connect the clutch housing 132 and the sun gear 75 to the case 83 preventing rotation thereof. When the pressure in the chamber 137 is released, the spring 144 supported by the ring 143 forces the piston away from the discs, disengaging them and permitting the clutch housing 132 and the sun gear 75 to rotate.

The clutch "B" has similar construction and operation as the brakes "A," "C," and "D." The housing 132 has a recess slidably supporting an annular piston 146 and longitudinal internal serrations 147 engaging mating external lugs on the driven discs and backing ring 146' of the clutch. A locking ring 147' supports the backing ring 146'. A clutch hub 148 has a cupped rim 149 having longitudinal external serrations engaging mating internal lugs on the driving discs of the clutch "B." The hub 148 and rim 149 are concentrically supported for rotation by the power input shaft 96 and suitably connected thereto by straight keys 150. A passage 133' is provided in the wall 136 and hub 83' for connecting the groove 133 to the surface 83" which is provided for attachment of a speed selector valve (not shown). A passage 152 in the clutch hub 131 connects the groove 133 to the pressure chamber 151.

In operation when fluid under pressure is admitted to the chamber 151, the piston 146 forces the driving and driven discs of the clutch "B" to frictionally engage each other and thereby connect the sun gear 75 to the power input shaft 96. When the pressure in the chamber 151 is released a spring 153 supported by a locking ring 154 forces the piston 146 away from the discs disengaging them and thereby permitting relative rotation between the input shaft 96 and the sun gear 75.

The case 83 has a flanged opening 151' at the bottom to which the oil pan or reservoir 64 is suitably connected. The reservoir 64 has a filter 152' which has passages 153' and 154' leading to flange passages 153" and 154" to connect to passages 62' and 172 respectively. The passages 153" and 154" are narrow enclosures at the flanges of the reservoir 64. A drain plug 152" is provided in the bottom of the reservoir 64.

The pump 73 has a housing 155 containing a concentric recess for an external gear 156 and an eccentric recess for an internal gear 157. The gear 156 is suitably connected to and rotated by the shaft 103 by a spline 158 and locking ring 159 that fits in a groove in the spline. The gear 156 meshes with the gear 157 at 160 and rotates it in the housing 155 when the shaft 103 is rotated. A pump backing plate 161 is provided to seal the gears 156 and 157 in their respective recesses. The housing 155 and plate 161 are concentrically supported in a recess 162 in the end part 84 adjacent the wall 116.

The pump 73 must deliver oil while rotating in either direction. This is provided for as follows: Ports 163 and 164 through the plate 161 are provided circumferentially on either side of the place 160 where the gear 156 meshes teeth with the gear 157. Passages 165 and 166 with recesses 167 and 168 and passages 169 and 170 (all in the part 84) connect the ports 163 and 164 respectively to the groove or transverse passage 171. A passage 172 in the case 83 connects the transverse passage 171 to the oil pan or reservoir 64. Check valves 173 and 174 with suitable springs 175 and 176 in the recesses 167 and 168 respectively permit flow of oil from the reservoir 64 to the pump 73 but a reverse flow is stopped at the valves 173 and 174. A retainer plate 177 suitably seals the recess 167 and 168 and serves as an abutment for the springs 175 and 176. A speedometer gear cover 178 is provided on the opposite side of the housing 155 from the plate 161. The cover 178 and the housing 155 have a set of two cooperating recesses 179, 180 and 181, 182, respectively, aligned with and connected to the passages 163 and 164 by a second set of ports 183 and 184, respectively, in the plate 161. Check valves 185 and 186 and suitable springs 187 and 188 are slidably supported in the cooperating recesses 179, 180 and 181, 182, respectively. A groove passage 189 in the cover 178 connects the recesses 179 and 180 to a passage 190 in the housing 155 and passage 189' in part 84 which connects to the surface 84" which is provided for the attachment of a speed selector valve. It will be seen that the check valves 185 and 186 permit flow from the pump 73 to the selector valve but reverse flow is checked. Therefore the passages 165 and 166 can function as both inlets and outlets to the pump depending upon its rotation.

A spiral speedometer drive gear 192 is suitably connected to the power output shaft 103 at a spline 193 and meshes with a spiral gear 194 which is suitably mounted for rotation in the cover 178 and is connected to a speedometer drive cable not shown herein. The cover 178 is formed with a boss 195 which supports the outer end of the shaft 103 and an oil seal 196 surrounding said shaft. The outer end of the shaft 103 is provided with a spline 197 for connection to a universal drive joint or other suitable means.

It will be seen that this arrangement if placed longitudinally in a motor vehicle will allow both front and rear wheels of said vehicle to be driven. This feature is desirable for military vehicles and others operating in cross-country service.

Figures 2, 3, 4:
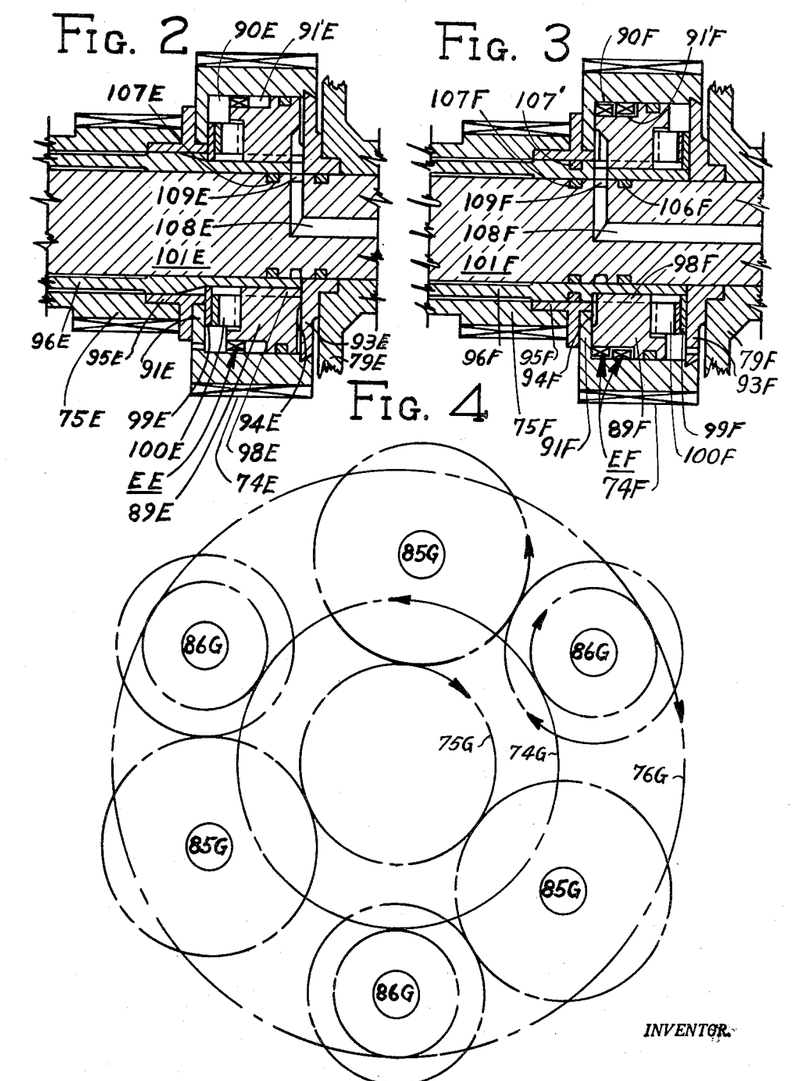
FIGURE 2 of the drawings is an enlarged longitudinal sectional view of the sun gears of the planetary gear set which is shown in FIGURE 1B of the drawings.
FIGURE 3 of the drawings is a variation of the dog clutch "EE" shown in FIGURE 2 of the drawings wherein the clutch "EF" is hydraulically engaged while the clutch "EE" in FIGURE 2 of the drawings, it will be noted, is hydraulically disengaged.
FIGURE 4 of the drawings is a diagram of the gear train pitch diameters showing the relative direction or inclination of rotation of the gears for forward speeds while the direction or inclination of rotation would be the opposite for reverse speeds. The view is taken through the gears while looking toward the engine and helps to visualize the relationship of the gears.

Now referring to FIGURE 2 of the drawings wherein the reference numerals are those of FIGURE 1 of the drawings and have the "suffix E." The assembly and function of the parts are identical to those shown in FIGURE 1B of the drawings, the operation of which is given supra, and is not repeated here.

FIGURE 3 of the drawings is a variation of the dog clutch "EE" shown in FIGURE 2 of the drawings, wherein the clutch "EF" is hydraulically engaged while the clutch "EE" in FIGURE 2 of the drawings, it will be noted, is hydraulically disengaged. All reference numerals of parts in FIGURE 3 of the drawings having the "suffix F" are the corresponding parts in FIGURES 1B and 2 of the drawings as indicated by the reference numerals. A description of all these parts is not repeated. For the purpose of this description let it suffice to say that the pressure chamber 94F, the synchronizing thrust washer 99F and the spring 100F are located on the opposite side of the gear hub and piston 89F from that which is shown in FIGURE 2 of the drawings. A sealing ring 107' is provided in a groove located in that part of the tubular input shaft 96F which contacts the flanged bushing 95F to form a seal between the two. The passage 108F and the annular groove 109F are relocated to align them with the new location of the pressure chamber 94F.

In operation the spring 100F forces the piston 89F away from the washer 99F and end wall 93F to disengage the mating external and internal lugs of the dog clutch "EF." Thus the sun gear 74F is free to rotate relative to the gear hub and piston 89F and the input shaft 96F. When fluid under pressure is admitted to the chamber 94F, the piston 89F is forced against the spring 100F, washer 99F and the end wall 93F. The external lugs of the clutch "EF" on the piston 89F slide into engagement with the internal lugs on the rim of the gear 74F. Thus the sun gear 74F is operatively connected to the input shaft 96F by means of the gear hub and piston 89F. The washer 99F fitted on the spline 98F helps to synchronize the speeds of the gear 74F with the hub 89F during engagement of the dog clutch "EF," by frictionally contacting the end wall 93F.

In FIGURE 4 of the drawings the pins 85G and 86G are the pins 85 and 86 respectively shown in FIGURE 1B of the drawings. For forward speeds the large sun gear 74G is the driver while the small sun gear 75G is the driver for reverse speeds. The outer ring gear 76G is stationary for low and reverse speeds. The small sun gear is stationary for intermediate forward speeds. The large and small sun gears are locked together for high forward speeds, the gear train then rotates as a unit.

Figure 5:
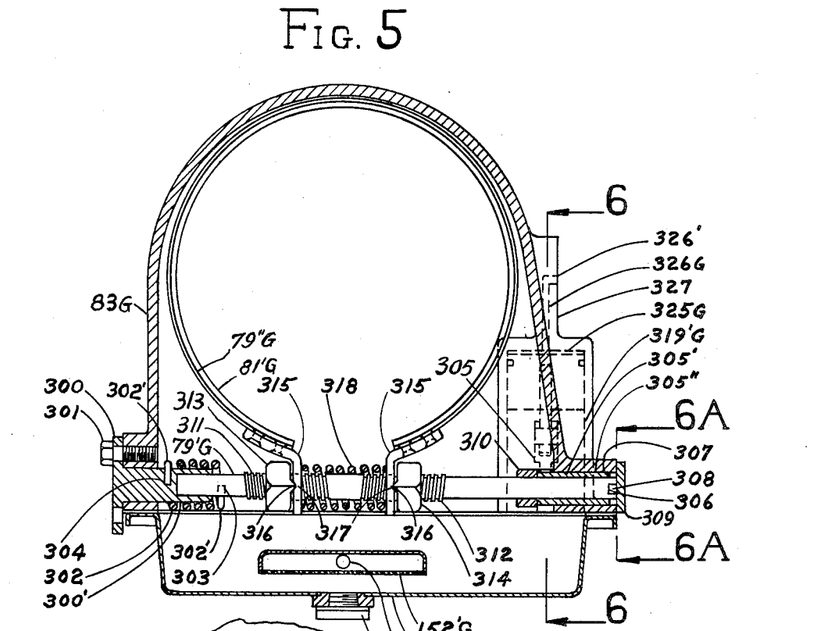
FIGURE 5 of the drawings is a transverse sectional view of the transmission taken substantially along the line 5—5 in FIGURE 1B of the drawings.

Now referring to FIGURE 5 of the drawings wherein the parts are given the reference numerals of their counterparts in the preceding figures of the drawings and have the "suffix G." The assembly and functions of all these parts are not repeated here. Let it suffice to say that the case 83G supports a flanged bearing 300 in a manner that makes it externally and rotatively adjustable as hereinafter described. The bearing 300 is secured and sealed to the case 83G by screws 301 and is counterbored on its inwardly extending end 300' to rotatively receive one end of the operating shaft 79'G which abuts the base of the counterbore and affords means of resisting thrust on the shaft in one direction. A helically coiled return spring 302, having hooked ends 302' is supported upon the inwardly extending end 300' and has one end suitably hooked into a hole 303 provided in the shaft 79'G while the other end of the spring is suitably hooked in a hole 304 provided in the extended end 300'.

Thus it will be seen that an external rotative adjustment of the flanged bushing 300, by removal of the screws 301, will provide an increase or decrease in the resilient torsional load of the spring 302 on the shaft 79'G.

On the opposite end of the shaft 79'G a suitably formed lever 305 is provided with a bore to receive said shaft end capable of rotative adjustment with the same. The lever 305 has a sleeve portion 305' extending to the end of the shaft 79'G and is supported in a bore 305" in the case 83G for oscillating motion therein. The end of the shaft 79'G has a lateral keyway 306 while the same end of the sleeve hub 306' has several such kayways 307.

Thus it will be seen that the lever 305 having the sleeve portion 305' can be rotatively adjusted or advanced relative to the shaft 79'G and locked in several positions by a key 308 placed in the keyways 306 and 307 to make the shaft 79'G and the lever 305 oscillate as a unit in the bore 305" of the case 83G. A thrust plate 309 retains the key 308 and provides means of resisting end thrust on the shaft 79'G in a direction opposite to the aforesaid one direction. A thrust collar 310 is suitably secured to the shaft 79'G at the inner end of the sleeve portion 305' to keep the ends of the sleeve and the shaft aligned and also transmit thrust of the shaft to said sleeve and thrust plate 309.

Right hand and left hand threaded portions 311 and 312 respectively are provided on opposite ends of the intermediate portion of the shaft 79'G and rotatively engage nuts 313 and 314 respectively which are suitably fixed to band connecting ends 315 by lugs 316 on the nuts and grooves 317 in the band ends. The band ends 315 are suitably connected to the brake band 79"G and are provided with holes through which the shaft 79'G freely passes. A helically coiled compression spring 318 is provided between the inner faces of the band ends 315 to provide a loaded contact between the lugs 316 and grooves 317 at all times. This loaded contact is controlled so that individual adjustment of the nuts 313 and 314 is possible with proper wrenches.

Thus it will be seen that rotation of the shaft 79'G in one direction will move the nuts 313 and 314 toward each other and a contraction or application of the brake band 79"G results while a rotation of the shaft 79'G in the opposite direction results in a movement of the nuts away from each other and an expansion or release of the band 79"G. (The contraction of the band 79"G is made to frictionally engage the lining 81'G with the drum portion 80" of the planet gear carrier part 80 and carrier 79 in FIGURE 1 of the drawings so that a contraction of the band 79"G actually acts as a brake on the shafts 101 and 103 in FIGURE 1 of the drawings, to which the carrier is connected.)

Figure 6:
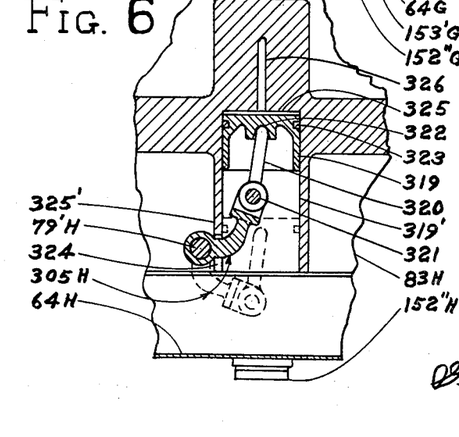
FIGURE 6 of the drawings is a longitudinal sectional view taken substantially along the line 6—6 in FIGURE 5 of the drawings.

In FIGURE 6 of the drawings the parts are given the reference numerals of their counterparts in other figures of the drawings and have the "suffix H." An hydraulically operated piston 319 slidably supported in a bore 319' in the case 83H and suitably connected to the lever 305H by a connecting rod 320 is the operating means of the shaft 79'H. Said rod 320 and lever 305H are pivotally connected by a pin 321. A recess 322 in the underside of the head of the piston 319 serves to retain the upper end of the rod 320, assisted by the action of the return spring 302 shown in FIGURE 5 of the drawings. A ring 323 in the head of the piston 319 forms a sealing means between said piston and the bore 319'. A slot 324 in a wall 325' of the bore 319' provides clearance for the lever 305H. A pressure chamber 325 is formed by the piston 319 in the bore 319' to which fluid under pressure is admitted through a passage 326 communicating with a port 326' in the attaching surface 327 in FIGURE 5 of the drawings provided for a control valve not shown.

Thus it will be seen that when fluid under pressure is admitted to the chamber 325, the piston 319 is forced downwardly causing the lever 305H to rotate the shaft 79'H counterwise to the torsional loading of the spring 302. This rotation moves the nuts 313 and 314 toward each other and results in a contraction or application of the brake band 79"G in FIGURE 5 of the drawings as heretofore described. Conversely a release of the fluid under pressure in the chamber 325 causes the torsionally loaded spring 302 to rotate the shaft 79'H in the opposite direction, returning the piston 319 to the upper position in the bore 319' resulting in an outward movement of the nuts 313 and 314 and a consequential expansion or release of the brake band 79"G in FIGURE 5 of the drawings.

Figure 6A:
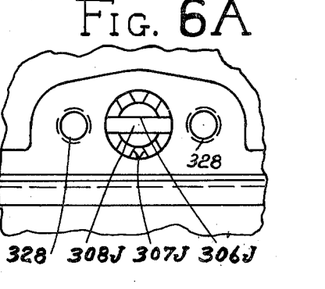
FIGURE 6A of the drawings is an enlarged elevational detailed view taken along the line 6A—6A in FIGURE 5 of the drawings.

In FIGURE 6A the parts are given the reference numerals of their counterparts in other figures of the drawings and have the "suffix J." Screws 328 serve to fasten and seal the thrust plate 309 in FIGURE 5 of the drawings to the case 83G. The plate 309 in FIGURE 5 of the drawings is removed and an external adjustment of the lever 305H of FIGURE 6 is made relative to the shaft 79'H thereof. This adjustment would be made while the torsional load of the spring 302 is removed, by removal of the screws 301 shown in FIGURE 5 of the drawings.

Figure 7:
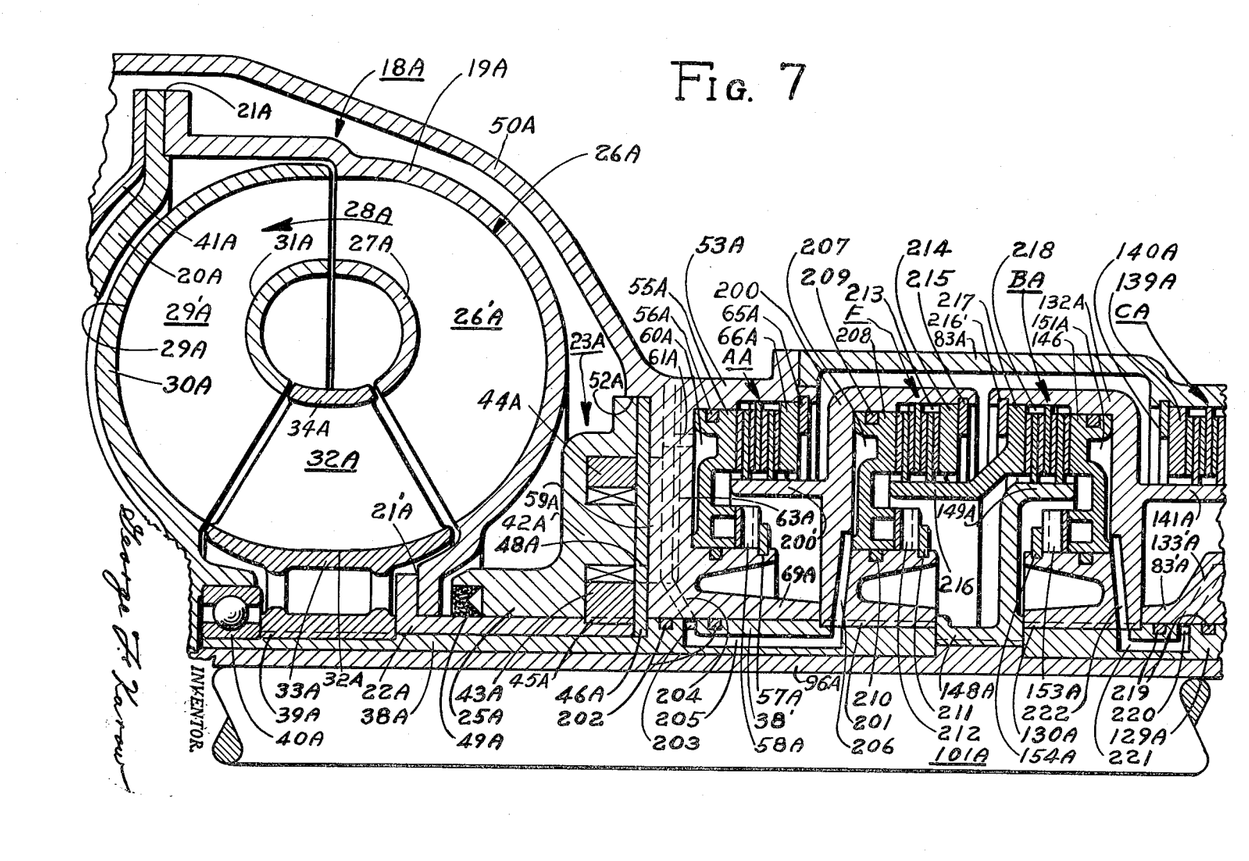
FIGURE 7 of the drawings is a partial view of a longitudinal section of another embodiment of this invention showing how the reaction member of a variable coupling means can be selectively connected to one of two driving elements of a planetary gear variable speed means.

Now referring to FIGURE 7 of the drawings wherein the parts are given the reference numerals of their corresponding parts in FIGURE 1B of the drawings and have the "suffix A." A description of all these references is not repeated here.

Let it suffice to say that the tubular brake shaft 38A has a somewhat larger portion 38' supported in the concentric hub 69A of the bell housing 50A and connected to a rotative clutch housing 200 at its hub by a spline 201. The housing 200 has a tubular extension 200' engaging the rotative discs of the brake "AA." Sealing rings 202 are supported in grooves in the surface of the part 38' supported by the hub of the housing 50A on either side of a grooved passage 203. A passage 204 in the wall 59A connects this groove 203 with the speed selector valve. A passage 205 in the portion 38' and another 206 in the clutch housing 200 connect the groove 203 to a pressure chamber 207 formed in the housing 200 by a piston 208 and the recess supporting said piston. A sealing ring 209 is supported in a groove in the outer diameter of the piston 208 and seals said piston to its supporting recess. A sealing ring 210 in a groove in the inner diameter of the recess for the piston 208 seals said piston to said groove at this juncture. A locking ring 211 provided in a second groove in the inner diameter of the recess for the piston 208 forcibly supports a corrugated washer spring 212 against said piston opposite the chamber side 207. Longitudinal internal serrations 213 are provided adjacent the recess for the piston 208 in the clutch "F." A locking ring 215 is provided in a groove in the housing 200 adjacent the serrations 213 for supporting a ring 214.

Longitudinal external serrations on a tubular extension 216 of a backing ring 217 of the clutch "BA" engage mating internal lugs of the driven discs of the clutch "F." Wearing rings are provided between the driving and driven discs of the clutch "F." A locking ring 216' in a groove in the housing 132A supports a ring 217.

The clutch "BA" has longitudinal internal serrations 218 in the housing 132A adjacent the recess for the piston 146A engaging mating external lugs on the driven discs and backing ring 217 of said clutch. The tubular extension 129A (of the small sun gear 75 of FIGURE 1) is rotatively supported in the hub 83'A and has sealing rings 219 supported in grooves on its outer surface on either side of a groove passage 220 to effectively seal said groove to said hub. A passage 133'A in the hub 83'A connects the groove 220 to the speed selector valve. A spline 130A connects the extension 129A to the hub of the housing 132A. Passages 221 and 222 in the extension 129A and clutch housing 132A respectively connect the groove passage 220 with the pressure chamber 151A.

In operation the brakes "AA," "CA" and clutch "BA" function as stated in the description of FIGURE 1B.

The clutch "F" operates hydraulically the same as the other disc clutch "BA" and selectively connects the reaction member 32A of the variable coupling means 18A to the extension 129A (of the small sun gear 75 of FIGURE 1).

Figure 8:
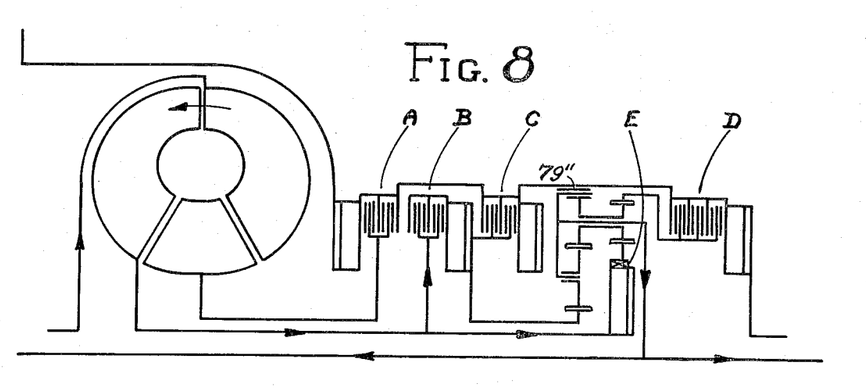
FIGURES 8 and 9 of the drawings are diagrammatic sketches of the power flow of the mechanisms shown in FIGURES 1B and 7 respectively.

The combination of clutches and brakes engaged for the various speed ranges for the different embodiments of this invention are listed below with the identifying numbers of the figures of the disclosures:

FIGURES 1B AND 8

| Speed | Brakes and Clutches Engaged |
|---|---|
| Low Gear plus Converter Reactor | A plus D plus (E). |
| Low Gear less Converter Reactor | D plus (E). |
| Intermediate Gear plus Conv. Reactor | A plus C plus (E). |
| Intermediate Gear less Conv. Reactor | C plus (E). |
| High Gear plus Converter Reactor | A plus B plus (E). |
| High Gear less Converter Reactor | B plus (E). |
| Reverse Gear plus Converter Reactor | A plus B plus D. |
| Reverse Gear less Converter Reactor | B plus D. |

Figure 9:
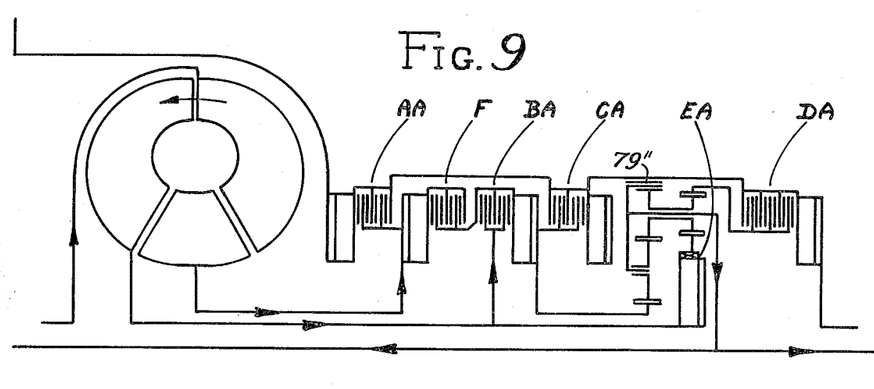

FIGURES 7 AND 9

| | |
|---|---|
| Low Gear plus Converter Reactor | AA plus DA plus (EA). |
| Low Gear less Converter Reactor | DA plus (EA). |
| Intermed. Gear plus Reactor | (AA or CA) plus F plus (EA). |
| Intermed. Gear less Reactor | (CA or F) plus (EA). |
| High Gear plus Reactor | AA plus BA plus (EA). |
| High Gear less Reactor | BA plus (EA). |
| Reverse Gear plus Reactor | AA plus BA plus DA. |
| Reverse Gear less Reactor | BA plus DA. |

From the above it will be noted that the clutches (E) and (EA) remain engaged for all forward speeds, being disengaged for reverse speeds only.

What I claim as my invention is:

1. A torque transmitting mechanism comprising the combination of compound planetary gearing including a plurality of driving elements having hollow-axis construction, a driven element and at least one set of two intermeshing planetary reversing gears, including one compound planetary gear, interconnecting the aforesaid elements; a power-input element extending coaxially through said driving elements, supported for rotation relative thereto; and independently operative means for coupling each of said driving elements to said power-input element.

2. The mechanism as in claim 1 wherein said driven element is a carrier for said planetary gears.

3. The mechanism as in claim 1 wherein said driving elements include at least two sun gears, one of said planetary gears meshes with one of said sun gears, the other planetary gear meshes with the other sun gear and has an axial portion meshing with said first planetary gear.

4. The mechanism as in claim 3 wherein an internal gear is supported for rotation coaxially with said gearing, meshing with at least one of the aforesaid planetary gears; and a brake is provided for controlling the rotation of said internal gear.

5. The mechanism as in claim 4 wherein a brake is provided for controlling the rotation of one of the aforesaid sun gears elements.

6. The mechanism as in claim 1 wherein said coupling means includes at least one clutch.

7. The mechanism as in claim 1 wherein said coupling means includes at least two clutches.

8. The mechanism as in claim 2 wherein said carrier for said planetary gears has an annular rim on the circumference thereof; and a brake is provided to engage said rim for controlling the rotation of said carrier.

9. The mechanism as in claim 1 wherein said power-input element has hollow-axis construction; a power-output element, extending coaxially through said hollow input element, is connected to the aforesaid driven element of the gearing on one side thereof; and a mechanism to be driven is connected to a portion of said power-output element extending beyond said power-input element, on the side of said gearing opposite said one side thereof.

10. The mechanism as in claim 9 wherein said driven element of the gearing has a shaft extending on said one side of said gearing; and a second mechanism to be driven is connected to said shaft extension.

11. The mechanism as in claim 9 wherein an engine has a shaft supported for rotation axially offset from the axis of said gearing, extending generally parallel thereto on said opposite side thereof; and a driving connection is provided between said engine shaft and said power-input element of said planetary gearing.

12. The mechanism as in claim 11 wherein said driving connection, between said engine shaft and said power-input element of said planetary gearing, includes gearing between the axes thereof.

13. The mechanism as in claim 11 wherein said driving connection, between said engine shaft and said power-input element of the planetary gearing, includes coupling means having a driven member connected to said power-input element of the gearing, a driving member driven by said engine shaft and means for engaging said members.

14. The mechanism as in claim 13 wherein said coupling means is a fluid torque converter having a turbine member connected to said power-input element, an impeller member driven by said engine shaft, a reactionary member and means is provided for controlling the rotation of said reactionary member.

15. A torque transmitting mechanism comprising the combination of planetary gearing including a plurality of driving elements having hollow-axis construction and a driven gear-carrier element, supported for rotation on a common axis, said gearing also including planetary gear means for interconnecting the aforesaid elements thereof; a power-input element extending coaxially through said driving elements, supported for rotation relative thereto; and independently operative means for coupling each of said driving elements to said power-input element.

16. The mechanism as in claim 15 wherein said driving elements include at least one sun gear; and said power-input element is a shaft.

17. The mechanism as in claim 15 wherein said coupling means include at least one clutch.

18. The mechanism as in claim 15 wherein said coupling means include at least two clutches.

19. The mechanism as in claim 16 wherein an internal gear is supported for rotation coaxially with said gearing, meshing with the aforesaid planetary gear means; and a brake is provided for controlling the rotation of said internal gear.

20. The mechanism as in claim 19 wherein a brake is provided for controlling the rotation of the aforesaid sun gear.

21. The mechanism as in claim 15 wherein said carrier for said planetary gear means has an annular rim on the circumference thereof; and a brake is provided to engage said rim for controlling the rotation of said carrier.

22. The mechanism as in claim 15 wherein said power-input element has hollow-axis construction; a power-output element, extending coaxially through said hollow input element, is connected to the aforesaid driven gear-carrier element at one side of said gearing; and a mechanism to be driven is connected to a portion of said power-output element extending beyond said power-input element, on the side of said gearing opposite said one side thereof.

23. The mechanism as in claim 22 wherein said driven gear-carrier element of the gearing has a shaft extending on said one side of the gearing; and a mechanism to be driven is connected to said shaft extension.

24. The mechanism as in claim 22 wherein an engine has a shaft supported for rotation axially offset from the axis of said planetary gearing, extending generally parallel thereto on said opposite side thereof; and a driving connection is provided between said engine shaft and said power-input element of the planetary gearing.

25. The mechanism as in claim 24 wherein said driving connection, between said engine shaft and said power-input element of said planetary gearing, includes gearing between the axes thereof.

26. The mechanism as in claim 24 wherein said driving connection, between said engine shaft and said power-input element of the planetary gearing, includes coupling means having a driven member connected to said power-input element, a driving member driven by said engine shaft and means for engaging said members is provided.

27. The mechanism as in claim 26 wherein said coupling means is a fluid torque converter having a turbine member connected to said power-input element, an impeller member driven by said engine shaft, a reactionary member and means is provided for controlling the rotation of said reactionary member.

28. A torque transmitting mechanism comprising the combination of a fluid torque converter including a driving member, a driven member and a reactionary member supported for rotation on a common axis; planetary gearing including a driving element, a driven gear-carrier element and a reactionary element, supported for rotation on said common axis, said gearing also including planetary gear means for interconnecting the aforesaid elements thereof; means including a clutch for connecting said driven member of the converter to said driving element of the gearing; means including a clutch for connecting said reactionary member of the converter to said reactionary element of the gearing; a brake for controlling the rotation of said reactionary member of the converter; and a brake for controlling the rotation of said reactionary element of the gearing.

29. The mechanism as in claim 28 wherein a clutch is provided for connecting said first named connecting-means to said second named connecting-means.

30. The mechanism as in claim 28 wherein said driving element and said reactionary element of said gearing are sun gears; and said planetary gear means includes at least two intermeshing planetary reversing gears.

31. The mechanism as in claim 30 wherein an internal gear is supported for rotation on said common axis, meshing with at least one of the aforesaid planetary gear means; and a brake is provided for controlling the rotation of said internal gear.

32. A torque transmitting mechanism comprising the combination of planetary gearing including a plurality of driving elements having hollow-axis construction and a driven element, supported for rotation on a common axis, said gearing also including planetary gear means for interconnecting the aforesaid elements thereof; a power-input element extending coaxially through said driving elements, supported for rotation relative thereto; and means adapted for independent or simultaneous engagement for transmitting torque through said power-input element to the aforesaid driving elements.

33. The mechanism as in claim 32 wherein said driven element is a gear-carrier for said planetary gear means.

34. The mechanism as in claim 32 wherein said planetary gear means includes planetary reversing gears.

35. A torque transmitting mechanism comprising the combination of planetary gearing including a plurality of driving elements having hollow-axis construction, and a driven element, supported for rotation on a common axis, said gearing also having means including planetary gears for interconnecting the aforesaid elements thereof; a power-input element extending coaxially through said driving elements, supported for rotation relative thereto; and means adapted for independent engagement for transmitting torque through said power-input element to the aforesaid driving elements.

36. The mechanism as in claim 35 wherein said driven element is a gear-carrier for said planetary gears.

37. The mechanism as in claim 35 wherein said planetary gears include reversing gears.

38. The mechanism as in claim 35 wherein said planetary gears include at least one compound gear.

References Cited in the file of this patent

UNITED STATES PATENTS

| | | |
|---|---|---|
| 2,396,361 | Browne | Mar. 12, 1946 |
| 2,448,345 | Aronson | Aug. 31, 1948 |
| 2,465,810 | McDonald | Mar. 29, 1949 |
| 2,581,025 | Karow | Jan. 1, 1952 |
| 2,608,885 | Lapsley | Sept. 2, 1952 |
| 2,620,684 | McFarland | Dec. 9, 1952 |
| 2,624,215 | McRae | Jan. 6, 1953 |
| 2,697,367 | Winther | Dec. 21, 1954 |
| 2,708,993 | Munschauer | May 24, 1955 |
| 2,877,665 | Karow | Mar. 17, 1959 |